United States Patent Office 3,810,971
Patented May 14, 1974

3,810,971
METAL RECOVERY FROM SALT MIXTURES OF COPPER AND METALS MORE ELECTROPOSITIVE THAN COPPER
Roald R. Skarbo, Lexington, and Antonio H. Miguel, Cambridge, Mass., assignors to Kennecott Copper Corporation, New York, N.Y.
Filed June 10, 1971, Ser. No. 151,677
Int. Cl. C01g 3/12
U.S. Cl. 423—565
9 Claims

ABSTRACT OF THE DISCLOSURE

Copper may be efficiently separated from metal salt mixtures, i.e. carbonate, chloride and sulfates by a process that comprises dissolving a portion of the metal salt mixture in hydrochloric acid, reducing the other portion of the metal salt mixture with a reducing gas, combining the hydrochloric acid solution and the reduced portion along with elemental sulfur to precipitate out substantially all of the copper in the metal salt mixture as cuprous sulfide.

CROSS REFERENCE TO RELATED APPLICATIONS

The instant application is related to the following identified applications:

U.S. application Ser. No. 55,305 filed July 16 1970, now U.S. Pat. No. 3,723,095, entitled "Extraction of Copper and Nickel from Manganese Nodules," R. R. Skarbo inventor.

U.S. application Ser. No. 55,608 filed July 16, 1970, now U.S. Pat. No. 3,753,686, entitled "Recovery of Copper, Nickel, Cobalt and Molybdenum From Complex Ores" T. C. Wilder and J. J. Andreola inventors.

U.S. application Ser. No. 55,306 filed July 16, 1970 now allowed, entitled "Two Stage Selective Leaching of Copper and Nickel From Complex Ores," T. C. Wilder inventor.

U.S. application Ser. No. 55,304 filed July 16, 1970 now allowed, entitled "Extraction of Metal Values from Complex Ores," M. J. Redman inventor.

U.S. application Ser. No. 90,131 filed Nov. 16 1970, now U.S. Pat. No. 3,728,105, entitled "Extraction of Metal Values From Manganese Deep Sea Nodules," R. R. Skarbo inventor.

BACKGROUND OF THE INVENTION

Field of invention

The instant application relates broadly to the field of hydrometallurgy and more specifically to a process for precipitating metal values from solutions. More specifically the application covers a hydrometallurgical process wherein the metal value obtained consists principally of copper.

Description of the prior art

The recovery of copper from various acid and carbonate solutions has been accomplished by precipitation with reducing gases and sulfur in the presence of a seed material. Particularly pertinent prior art patents are U.S. Pat. Nos. 1,382,361; 2,352,096; 2,362,202 and 2,734 821. U.S. Pat. No. 1,382,361 discloses a process in which a bessemerized copper-nickel matte having been ground and roasted is subject to a treatment with dilute sulfuric acid to dissolve out the greater part of the copper present. A certain portion of the roasted and leached matte is reduced by a gaseous reducing agent to a metallic powder. The metallic powder is then used to cement the copper from a dilute sulfuric acid solution.

Langer et al. U.S. Pat. No. 1,291,030, discloses the treating of finely ground roasted nickel matte with dilute sulfuric acid to dissolve out copper present in the matte. The undissolved portion of the matte is then treated with strong sulfuric acid at a temperature of about 150° C. The sulfates so formed are dissolved in water. The copper is then precipitated from the solution by means of finely divided metallic nickel.

The prior art patents most closely related to the instant invention appear to be those of John O. Hay, U.S. Pat. Nos. 2,362,202 and 2,352,096. The latter patent deals with the processing of scrap alloys containing copper and nickel and teaches that the amount of sulfur added should be in excess of that required to form sulfide with the copper contained in the solids, i.e. cementation agent, and the copper contained in the solution, yielding copper sulfide which in composition may vary between cupric and cuprous sulfide.

The applicants have found, however, that the addition of sulfur can be controlled such that all the copper introduced into the process is converted to cuprous sulfide rather than cupric sulfide or a mixture of cupric and cuprous sulfide. The applicants have also discovered, as will be more fully illustrated hereinafter, that the careful control of the amount of sulfur added, such that essentially all the copper introduced is converted to cuprous sulfide, results in greatly improved separation of copper from the other metal ions in solution. In addition to a substantially lower sulfur consumption, the unobviousness of our discovery is that a copper product with a copper-nickel weight ratio of about 100:1 can be obtained by the process claimed herein. In contrast see Example III of the Hay's Pat. 2,352,096 where a copper-nickel ratio of a mixed sulfide precipitate of approximately 8.2 is shown.

SUMMARY OF THE INVENTION

This process in general relates to the recovery of copper from metal salts mixtures containing metals more electropositive than copper. More specifically the process is directed to recovering copper from metal salt mixtures containing copper, nickel and cobalt and other incidental impurity metals. The metal salt mixtures, may for example, contain a copper to nickel plus cobalt weight ratio of from about 0.2 to about 5.0. Preferably the metal salt mixture is a basic carbonate mixture containing copper, nickel and cobalt in a weight ratio of about 1:1:0.2. The process comprises the steps of dividing the metal salt mixture into two portions. The first portion may be, for example, from about 25 to about 75% of the total mixture, and preferably about 50%. The second portion is, therefore, from about 75 to about 25% of the total mixture. The first portion of the metal salt mixture is treated with an aqueous hydrochloric acid solution having a pH value maintained at from about 0 to about 1.5. Preferably, the hydrochloric acid solution containing the dissolved carbonate therein is heated to a temperature of from about 60–90° C. prior to the addition thereto of the precipitation agent and the sulfur, and holding the suspension of precipitation agent and sulfur in the hydrochloric acid solution at a temperature between about 60 and 90° C.

for at least 30 minutes. The second portion of the metal salt mixture is reduced with a reducing gas. The acid solution containing the first portion of the metal salt mixture is reacted with the reduced metal salt mixture (second portion) in the presence of a controlled amount of sulfur whereby substantially all of the copper in the solution is precipitated. Preferably, the hydrochloric acid solution and the hydrochloric acid solution in admixture with the precipitation agent and sulfur are maintained at a temperature between about 60° C. and the boiling temperature of the solution until the precipitation of copper is essentially complete.

DESCRIPTION OF PREFERRED EMBODIMENTS

Figure 1:
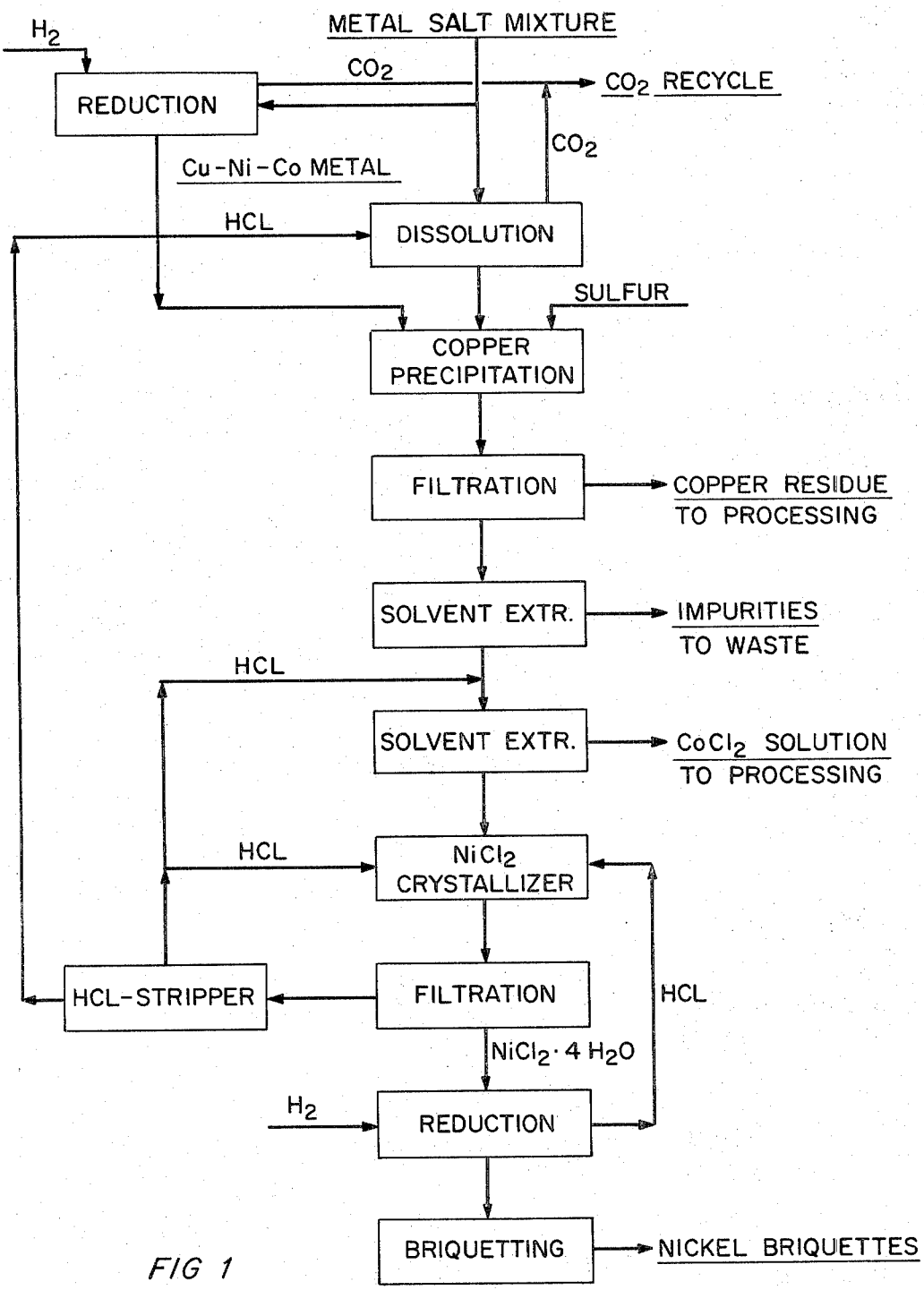
FIG. 1 is a flow diagram representing an overall process for recovery of copper, nickel and cobalt from a metal salt mixture containing these three metals.
Figure 2:
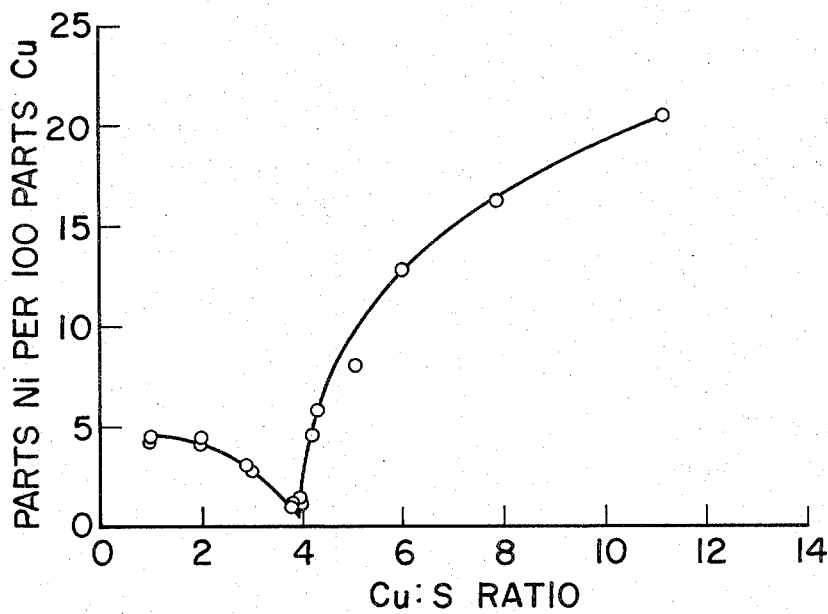
FIG. 2 graphically presents the effect of the copper-sulfur weight ratio on the nickel content of the recovered copper. This figure shows the criticality of controlling the amount of sulfur added to the reaction mixture within fairly narrow limits.
Figure 3:
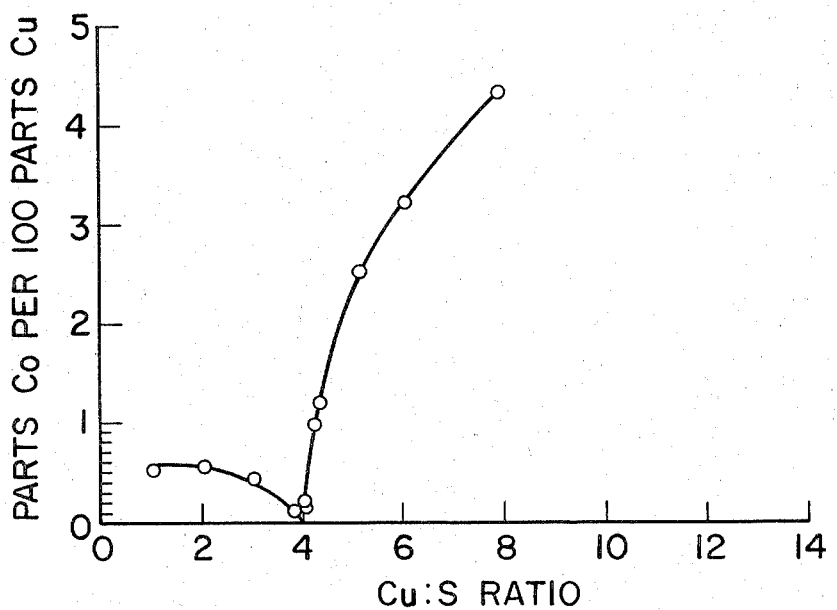
FIG. 3 graphically presents the effects of sulfur on the cobalt content of copper recovered showing the optimum copper-sulfur weight ratio.

The process of this invention was specifically developed for the recovery of copper, nickel and cobalt from carbonate ammoniacal leach solutions derived from manganese nodules. See the above noted cross reference to related applications for sources of leach solutions. However the process is applicable to any metal salt mixture containing copper and metals more electropositive than copper. For example, the process is applicable to the recovery of copper, nickel, and cobalt from metal salt mixtures containing chlorides and sulfates as well.

Ammoniacal leach solutions derived from the leaching of manganese nodules typically contains copper, nickel and cobalt in a weight ratio of about 1:1:0.2. Copper, nickel and cobalt are readily precipitated from ammoniacal leach solutions as a mixture of basic carbonates by the stripping of ammonia and carbon dioxide from the solution. The basic carbonate mixtures obtained therefrom is the preferred feed material for the process disclosed and claimed herein.

Processing of the ammoniacal leach solutions, or the carbonate mixture, by known methods is unattractive. The main reason for this being the unfavorable copper-nickel-cobalt ratio of the leach solution. Application of conventional processes for recovery of the valuable metals poses problems of high costs, impure products and disposal of large amounts of undesirable by-products. The process of this invention has overcome those problems.

Although the advantages of the process are obvious in the case of leach solutions or salt mixtures with a copper-nickel-cobalt weight ratio of about 1:1:0.2, the process can also be readily adapted to solutions or salt mixtures of other compositions. Furthermore the process is not restricted to carbonate mixtures but can also be used for recovery of copper, nickel and cobalt from salt mixtures such as chlorides and sulfates. Moreover the process can be adapted to recover metals from salt mixtures which contain copper and a metal or metals more electropositive than copper, e.g., salt mixtures of copper and iron.

CHEMISTRY OF THE COPPER SEPARATION STEP

The reactions likely to occur during the copper separation step are as follows:

$$Cu/Ni(Co) + Cu^{++} + S \rightarrow Cu_2S + Ni^{++}(Co^{++}) \quad (1)$$

$$Ni(Co) + 2H^+ \rightarrow Ni^{++}(Co^{++}) + H_2 \quad (2)$$

If separation of the copper from the solution were made by precipitation with hydrogen sulfide, the sulfur consumed would be twice that given by the above equations. Hydrogen sulfide precipitation of copper results in a fine slurry precipitate which is extremely difficult to filter.

The separation method of this invention results in a granular precipitate of cuprous sulfide ($Cu_2S$). This precipitate settles rapidly and is readily filterable.

Using hydrogen sulfide for the precipitation of copper results in a net production of hydrochloric acid according to the formula $$CuCl_2 + H_2S \rightarrow CuS + 2HCl \quad (3)$$

The process of this invention does not result in a build up of hydrochloric acid which would have to be removed from the processing streams and disposed of. The above reactions are based on the use of a carbonate mixture containing copper, nickel and cobalt in a weight ratio of about 1:1:0.2.

Although from about 25 to 75% of a salt mixture may be dissolved in the hydrochloric acid solution, in the preferred embodiment about one half of the salt mixture is dissolved. The remaining salt mixture is reduced with a reducing gas such as hydrogen, carbon monoxide or mixtures of hydrogen and carbon monoxide. Reduction takes place at temperatures from about 300 to 800° C., preferably 350 to 500° C.

We have found that for salt mixtures, as described above, that the optimum sulfur addition is such that the copper in the system to sulfur weight ratio is from about 2.9 to about 4.0. This rate of sulfur addition provides a readily filterable cuprous sulfide precipitate having a copper to nickel weight ratio of about 100:1 and a solution containing a nickel to copper weight ratio of about 100:1. Reaction (2) results from the chemical dissolution of nickel and cobalt in the salt mixture. In the reduced metallic product there is usually an excess of nickel and cobalt over that required to precipitate copper from the solution. In the preferred case, i.e. where the copper, nickel, cobalt weight ratio is about 1:1:0.2 the optimum sulfur addition is the amount required to form cuprous sulfide with all the copper introduced.

In addition to the above we may have a metal salt composition where the copper to nickel plus cobalt weight ratio in the salt mixture is equal to or greater than 1. The weight ratio between the amount of salt mixture dissolved and salt mixture reduced should be such that the gram mols of nickel plus cobalt in the metallic product is equal to or greater than the gram mols of cupric ion in solution. The excess of nickel and cobalt required will depend on the reactivity of the reduced metallic product. The optimum amount of sulfur is that required to form cuprous sulfide with all copper introduced in the system, i.e., copper in the solution plus copper in the reduced metallic product.

The following specific examples are illustrative but not limitative of our invention, it being understood that similar improved results are obtained without departing from the scope of the invention. All such variations which do not depart from the basic concept of the invention disclosed above are intended to come within the scope of the appended claims.

EXAMPLE I

A basic carbonate mixture of copper, nickel and cobalt was prepared by stripping ammonia and carbon dioxide from an ammoniacal solution containing the respective metals in a weight ratio of about 1:1:0.2. After drying at room temperature the carbonate mixture analyzed 23.6% copper, 22.2% nickel and 4.8% cobalt.

Twelve grams of the carbonate mixture was converted to the metallic state by reduction for about 90 minutes at 350° C. with hydrogen. Another 12 grams portion of the carbonate mixture was dissolved in 100 ml. hydrochloric acid at a constant pH of about 0.5. After the hydrochloric acid solution was heated to 80° C., the reduced metallic product was added. While agitating vigorously the reaction mixture was maintained at 80° C. for about 90 minutes. The suspension was then filtered and the residue and the filtrate were analyzed for copper, nickel and cobalt. The chemical analysis revealed that the copper, nickel, cobalt weight ratio of the residue was 100:50:7 and the copper, nickel and cobalt weight ratio of the filtrate was 100:71.6:23.5. The results illustrate that the metallic product prepared according to the procedure of this example, is not suitable for separation of copper from nickel and cobalt by conventional cementation or precipitation techniques.

EXAMPLE II

Twelve grams of a basic carbonate mixture, assaying 23.6% copper, 22.2% nickel and 4.8% cobalt by weight, was converted to the metallic state by reduction for 90 minutes at 350° C. with hydrogen. In 100 ml. of HCl at a constant pH of about 0.5 another 12 gram portion of the carbonate mixture was dissolved. The acid solution containing the dissolved carbonates was heated to about 80° C. and the reduced metallic product along with 0.5 grams of —100 mesh elemental sulfur was added. The reaction mixture was maintained at 80° C. for about 90 minutes under vigorous stirring. After filtration the residue was washed with dilute hydrochloric acid (pH=1.0) and dried at room temperature. The dry residue weighed 5.1 grams and contained 72.15% copper, 14.83% nickel, 3.07% cobalt and 9.95% sulfur by weight. This was a copper, nickel, cobalt weight ratio of 100:20.6:4.2. The filtrate had a pH of 1.5 and contained 47.5 grams nickel per liter, 19.95 grams copper per liter and 9.7 grams cobalt per liter resulting in a nickel, copper and cobalt weight ratio of 100:42.0:20.4.

Example II shows that the efficiency of the copper separation step is significantly improved by carrying out the separation in the presence of elemental sulfur even at a copper-sulfur weight rtaio of approximately 11:1.

EXAMPLE III

This example illustrates the effects of reaction temperature on the efficiency of the separation process. The experimental procedure used in the experiments of this example was identical to that described in Example II above except that 1.2 grams of sulfur and different reaction temperatures were used. The temperatures of reaction, as indicated from the table below, ranged from about 23–80° C. The results in these experiments were as follows:

TABLE I

| Temperature (° C.) | Filtrate, grams per liter | | Residue, Cu:Ni ratio |
|---|---|---|---|
| | Nickel | Copper | |
| 23 | 46.3 | 5.4 | 100:10.2 |
| 40 | 43.8 | 5.7 | 100:10.5 |
| 60 | 46.8 | 6.1 | 100:8.6 |
| 80 | 42.8 | 4.1 | 100:8.1 |

The results show that an effective separation of copper from nickel and cobalt can be obtained at temperatures as low as room temperature. However, it is preferred to carry the reaction out at a temperature of at least about 80° C. in order to minimize the nickel content of the copper residue.

EXAMPLE IV

The effects of the reaction time on the efficiency of the separation process is examined in this example. The experimental procedure used in the experiments of this example was essentially the same as that of Example II except that 1.2 grams of sulfur and different reaction times were used. Reaction times varied from about 30 minutes to 360 minutes. The results of these experiments are as follows:

TABLE II

| Reaction time (minutes) | Filtrate, grams per liter | | Percent copper precipitated | Residue, Cu:Ni ratio |
|---|---|---|---|---|
| | Nickel | Copper | | |
| 30 | 42.8 | 5.05 | 72.2 | 100:11.1 |
| 60 | 48.5 | 3.13 | 88.9 | 100:16.1:4.3 |
| 120 | 49.5 | 2.30 | 91.9 | 100:7.0 |
| 240 | 50.0 | 0.80 | 97.2 | 100:5.3 |
| 360 | 51.8 | 0.47 | 98.3 | 100:4.2 |

The example shows that the nickel content of the copper residue is decreased by increasing the reaction time. The increased reaction time also results in a more complete precipitation of copper.

The copper-sulfur weight ratio used in Examples III and IV is somewhat higher than the optimum as illustrated in the following example.

EXAMPLE V

This example illustrates the relationship between the copper-sulfur weight ratio and the purity, i.e. nickel and cobalt content of the copper residue. The example also shows the percent of copper precipitated at various copper-sulfur weight ratios. The copper-sulfur weight ratio refers to the ratio between the total weight of the copper present, that is copper in the solution and the copper in the metallic product, and the weight of the sulfur added. The experimental conditions used in the experiments of this example are identical to that described in Example II above except that the copper-sulfur weight ratio was varied from 1.0 to 11.2. The initial carbonate mixture used contained 23.2% copper, 21.7% nickel and 4.38% cobalt by weight. The chloride solution analyzed 29.3 grams copper per liter, 28.8 grams nickel per liter, and 5.87 grams cobalt per liter. The results are shown in the following tabulation:

TABLE III

| Cu:S ratio | Filtrate, grams per liter | | | Percent copper precipitated | Copper residue, Cu:Ni:Co weight ratio |
|---|---|---|---|---|---|
| | Copper | Nickel | Cobalt | | |
| 11.2 | 20.0 | 47.5 | 9.7 | 31.9 | 100:20.6:4.2 |
| 7.9 | 16.0 | 48.0 | 9.5 | 45.6 | 100:16.1:4.3 |
| 6.0 | 12.2 | 49.3 | 9.8 | 58.4 | 100:12.7:3.2 |
| 5.1 | 6.58 | 50.0 | 10.0 | 77.6 | 100:8.0:2.5 |
| 4.3 | 2.93 | 50.3 | 10.5 | 90.0 | 100:5.7:1.2 |
| 4.2 | 3.15 | 50.5 | 10.4 | 89.3 | 100:4.5:0.87 |
| 4.0 | 0.027 | 52.5 | 11.1 | 99.9 | 100:1.4:0.21 |
| 4.0 | 0.036 | 52.5 | 10.8 | 99.9 | 100:1.2:0.16 |
| 3.8 | 0.116 | 55.0 | 11.0 | 99.6 | 100:0.83:0.08 |
| 3.8 | 0.116 | 53.3 | 11.1 | 99.6 | 100:0.91:0.11 |
| 3.5 | 0.019 | 52.5 | 11.1 | 99.9 | 100:1.09:0.12 |
| 3.0 | 0.189 | 52.0 | 10.6 | 99.4 | 100:2.8:0.43 |
| 2.9 | 0.280 | 51.8 | 10.7 | 99.0 | 100:3.0:0.45 |
| 2.0 | 1.40 | 52.5 | 10.8 | 95.2 | 100:4.3:0.53 |
| 2.0 | 2.06 | 51.5 | 10.6 | 93.0 | 100:4.5:0.56 |
| 1.0 | 1.33 | 52.8 | 11.1 | 95.5 | 100:4.2:0.47 |
| 1.0 | 2.10 | 51.0 | 10.6 | 92.8 | 100:4.4:0.50 |

This example shows that there is an optimum copper-sulfur weight ratio at approximately 3.8 which results in essentially complete separation of the copper from the nickel and cobalt. A very satisfactory copper-sulfur weight ratio range exists from about 2.9 to 4.0 where about 99% of the copper can be recovered.

X-ray diffraction analysis of a residue prepared at the optimum copper-sulfur weight ratio of 3.8 revealed the copper to be present in the form of cuprous sulfide. No evidence for the presence of either copper metal or cupric sulfide was found. This result suggests that the optimum copper-sulfur weight ratio is theoretically that required to convert all the copper introduced to the cuprous sulfide.

EXAMPLE VI

Twenty-four grams of a basic carbonate mixture of copper, nickel and cobalt was dissolved in hydrochloric acid to yield 100 ml. of solution at a pH of about 0.2 and containing 58.6 grams copper per liter, 56.1 grams nickel per liter and 11.6 grams cobalt per liter. Another twenty-four gram portion of the basic carbonate mixture was converted to the metallic state by reduction for 90 minutes at 350° C. with hydrogen. The hydrochloric acid solution was heated to 80° C. at which temperature the reduced metallic product along with —100 mesh elemental sulfur was added. (The amount of sulfur added corresponds to a copper-sulfur weight ratio of 3.7.) The reaction mixture was held at 80° C. for 90 minutes under vigorous stirring. After filtration the residue was washed with hydrochloric acid and dried at room temperature. Chemical analysis revealed the residue to contain copper, nickel and cobalt in a weight ratio of 100:1.4:0.09. The filtrate analyzed 104.5 grams nickel per liter, 21.8 grams cobalt per liter and 0.082 gram copper per liter. More than 99.9% of the total copper introduced into the experiment was recovered in the copper residue.

EXAMPLE VII

Basic carbonates of copper, nickel and cobalt were dissolved in sulfuric acid to yield 100 ml. of sulfate solution at a pH value of about 0.5. The solution contained 28.9 grams copper per liter, 28.9 grams nickel per liter and 5.75 grams cobalt per liter. A twelve gram portion of a basic carbonate mixture containing 23.2% copper, 21.7% nickel and 4.38% cobalt by weight was reduced to the metallic state according to the procedure of Example II. The sulfate solution was heated to 80° C. at which temperature the reduced metallic product along with —100 mesh elemental sulfur was added. The amount of sulfur added corresponds to a copper-sulfur weight ratio of 4.0. The reaction mixture was maintained at 80° C. for 90 minutes under vigorous propeller stirring. After filtration the residue was washed with dilute $H_2SO_4$ at a pH of about 1.0 and dried at room temperature. Chemical analysis of the residue showed a copper, nickel and cobalt weight ratio of 100:0.84:0.06. The filtrate analyzed 56 grams nickel per liter, 17.5 grams cobalt per liter and 1.25 grams copper per liter. Thus 95.7% of the copper present in the original solution was precipitated.

EXAMPLE VIII

Twelve grams of a basic carbonate mixture assaying 23.5% copper, 21.6% nickel and 4.6% cobalt by weight was converted to the metallic state by reduction for 90 minutes at 350° C. with hydrogen. Another 12 gram portion of carbonate was dissolved in hydrochloric acid at a constant pH of about 0.5 to yield 100 ml. solution analyzing 28.2 grams copper per liter. 25.9 grams nickel per liter and 5.46 grams cobalt per liter. The chloride solution was heated to 80° C. at which temperature the reduced metallic product along with 1.2 grams of —100 mesh sulfur was added. The reaction mixture was maintained for 90 minutes at 80° C. while agitation was continued. After filtration the filtrate was found to contain 0.022 gram copper per liter, corresponding to a precipitation of 99.9% of the copper originally present in the solution. The residue from the filtration was transferred to a flask containing 100 ml. of fresh chloride solution at a pH of about 0.5 and assaying 28.2 grams copper per liter, 25.9 grams nickel per liter and 5.46 grams cobalt per liter. The second reaction mixture was heated to 80° C. and maintained at that temperature for 30 minutes while stirring. The suspension was then filtered and the residue dried at room temperature. Chemical analysis of the second dry residue indicated a copper, nickel, cobalt weight ratio of 100:0.07:0.05.

Without further analysis, the foregoing description and examples will so fully reveal the gist of the present invention that others can, by applying current knowledge, readily adapt it for various applications without omitting features that, from the standpoint of the prior art, fairly constitute essential characteristics of the generic or specific aspects of this invention and, therefore, such adaptations are intended to be comprehended within the meaning and the range of equivalence of the following claims.

What is claimed as new and desired to be secured by letters patent is:

1. The process of removing copper from a metal salt mixture containing copper and metals more electropositive than copper, comprising the steps of:
    (a) dissolving a first part of said metal salt mixture in an aqueous hydrochloric acid solution having a pH value maintained from about 0 to about 1.5, said first part being from about 25 to about 75% of said metal salt mixture;
    (b) reducing a second part of said metal salt mixture with a gas selected from hydrogen, carbon monoxide and mixtures of hydrogen and carbon monoxide at a temperature of from about 300 to 800° C. whereby a reduced metallic product precipitation agent is produced, said second part being from about 75 to about 25% of said metal salt mixture;
    (c) mixing the hydrochloric acid solution of step (a) with the precipitation agent of step (b) and elemental sulfur such that the weight ratio of the total copper in the mixture to sulfur is from 2.9 to 4.0 whereby essentially all of the copper present in the mixture is precipitated as cuprous sulphide;
    (d) separating the precipitated cuprous sulphide from the solution to obtain a substantially copper free solution containing the metals more electropositive than copper and a copper precipitate substantially free of metals more electropositive than copper.

2. Process of claim 1 wherein the metal salt mixture is a mixture of carbonates.

3. The process of claim 1 wherein the metal salt mixture is a mixture of metal chlorides.

4. The process of claim 1 wherein the metal salt mixture is a mixture of metal sulfates.

5. The process of claim 1 wherein the metal salt mixture contains copper, nickel and cobalt in a weight ratio of about 1:1:0.2.

6. The process of claim 1 wherein the metal salt mixture is a basic carbonate mixture containing copper to nickel plus cobalt in a weight ratio of from about 0.2 to about 5.0.

7. The process of claim 2 wherein the hydrochloric acid solution containing the dissolved carbonate therein is heated to a temperature of from about 60 to 90° C. prior to the addition thereto of the precipitation agent and the sulfur, and holding the suspension of precipitation agent and sulfur in the hydrochloric acid solution at a temperature between about 60 and 90° C. for at least 30 minutes.

8. The process of removing copper from a metal salt mixture of basic carbonates containing copper, nickel, cobalt, and other incidental impurities, said metal salt mixture having a copper to nickel plus cobalt weight ratio of from about 0.2 to about 5.0, comprising the steps of:
    (a) dissolving a first part of said metal salt mixture in aqueous hydrochloric acid maintained at a pH value of about 0.5, said first part being about 50% of said metal salt mixture;
    (b) reducing a second part of said metal salt mixture with hydrogen at a temperature of from about 300 to about 500° C. whereby a metallic product precipitation agent having a copper to nickel weight ratio of about 1:1 is produced;
    (c) mixing the hydrochloric acid solution of step (a) with the precipitation agent from step (b) in the presence of sulfur such that the weight ratio of the total copper in the mixture to sulfur is from 2.9 to 4.0 whereby essentially all of the copper present in the mixture is precipitated as cuprous sulphide;
    (d) separating the precipitated cuprous sulphide from the remaining solution thereby obtaining a copper product having a copper-nickel weight ratio of about 100:1 and the remaining solution contains a nickel-copper ratio of about 100:1.

9. The process of claim 8 wherein the hydrochloric acid solution and the hydrochloric acid solution in admixture with the precipitation agent and sulfur are maintained at a temperature between about 60° C. and the boiling temperature of the solution until the precipitation of copper is essentially complete.

References Cited

UNITED STATES PATENTS

| | | | |
|---|---|---|---|
| 2,332,145 | 10/1943 | Hay IV | 23—135 |
| 2,352,096 | 6/1944 | Hay I | 23—135 |
| 2,362,202 | 11/1944 | Hay II | 23—135 X |
| 2,367,022 | 1/1945 | Hay III | 23—135 X |

OTHER REFERENCES

"Treatise on Inorganic Chemistry," by H. Remy, vol. II, 1956 ed., p. 382. Elsevier Pub. Co., New York. Copy Scientific Lib.

"A Comprehensive Treatise on Inorganic and Theoretical Chemistry," vol. III, New Impression, September 1946, p. 210, Longmans, Green & Co., New York. Copy Scient. Lib.

EDWARD STERN, Primary Examiner

U.S. Cl. X.R.

423—561; 75—109, 117